United States Patent [19]

Andersen

[11] 3,922,424

[45] Nov. 25, 1975

[54] NON-WOVEN FIBROUS MATERIAL BONDED WITH ETHYLENE/VINYL CHLORIDE INTERPOLYMERS

[75] Inventor: Harry M. Andersen, Ballwin, Mo.

[73] Assignee: Monsanto Company, St. Louis, Mo.

[22] Filed: Jan. 31, 1973

[21] Appl. No.: 328,165

Related U.S. Application Data

[63] Continuation-in-part of Ser. No. 255,367, May 22, 1972, abandoned.

[52] U.S. Cl. ............... 428/264; 428/265; 428/267; 428/475; 428/520; 260/897 C; 260/80.73
[51] Int. Cl.² ................... D04H 1/58; B32B 23/08
[58] Field of Search...... 162/168, 169; 117/155 UA, 117/161 UT; 260/80.73, 897 C, 29.6 WB; 161/150, 170

[56] References Cited
UNITED STATES PATENTS

| 3,428,582 | 2/1969 | Deex | 260/80.73 |
|---|---|---|---|
| 3,503,918 | 3/1970 | LeSota | 260/29.6 TA |
| 3,629,209 | 12/1971 | McDonald et al. | 260/80.73 |
| 3,632,424 | 1/1972 | Graham et al. | 117/155 UA |
| 3,647,615 | 3/1972 | Fallwell | 161/170 |
| 3,658,579 | 4/1972 | Ottinger | 260/29.6 TA |
| 3,700,492 | 10/1972 | Bergomi | 260/29.6 TA |
| 3,755,233 | 8/1973 | Fallwell | 260/80.73 |
| 3,758,429 | 9/1973 | Fallwell | 260/80.73 |
| 3,803,072 | 4/1974 | Graham et al. | 117/155 UA |

Primary Examiner—George F. Lesmes
Assistant Examiner—William R. Dixon, Jr.
Attorney, Agent, or Firm—N. E. Willis; H. B. Roberts; F. D. Shearin

[57] ABSTRACT

Nonwoven fibrous products bonded with ethylene/vinyl chloride/acrylamine/N-(alkoxymethyl)acrylamide interpolymers.

11 Claims, No Drawings

NON-WOVEN FIBROUS MATERIAL BONDED WITH ETHYLENE/VINYL CHLORIDE INTERPOLYMERS

RELATED CASES

This application is a continuation-in-part of application Ser. No. 255,367, filed May 22, 1972 now abandoned.

BACKGROUND OF THE INVENTION

1. FIELD OF THE INVENTION

This invention relates to nonwoven fibers bonded with acrylamide/ethylene/vinyl chloride/N-(alkoxymethyl)-acrylamide interpolymers.

2. DESCRIPTION OF THE PRIOR ART

Many known polymers are useful as binders for nonwovens in their latex or solution form. Generally, latices are used for ease of application. However, many of these latices are unsatisfactory for a variety of reasons. Some require external cross-linking agents. Others lack mechanical or shear strength, especially at high temperatures. Still others require long curing times at high temperatures.

Other latices do not provide nonwoven fabrics having satisfactory resistance to solvents, laundering or dry cleaning. Somer adversely affect the strength, hand or drape of the bonded fibers.

Nonwovens bonded with interpolymers that do not possess any of the above mentioned disadvantages would be an advancement in the art.

BRIEF DESCRIPTION OF THE INVENTION

In accordance with this invention, it was surprisingly found that nonwovens bonded with ethylene/vinyl chloride/acrylamide/N-(alkoxymethyl)acrylamide interpolymers have satisfactory resistance to solvents, laundering and dry cleaning as well as adequate strength, hand and drape. Novel latices are self cross-linkable and have high shear or mechanical stability. They require short curing times at low temperatures. These interpolymers comprise:

A. ethylene; (E)
B. vinyl chloride; (VCL)
C. acrylamide or acrylamide in combination with another polar monomer selected from the group consisting of methacrylamide; N-(alkyl)acrylamide; N-(alkyl)meth-acrylamide unsaturated carboxylic acids; alkali metal salts and ammonium salts of unsaturated carboxylic acids; acrylylamides and methacrylylamides of aminoalkanoic acids; and alkyl and hydroxy alkyl esters of unsaturated carboxylic acids; and
D. a compound represented by the formula

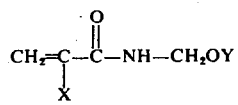   FORMULA I wherein X represents $CH_3$ or hydrogen and Y represents an alkyl group containing 1 to 10 carbon atoms.

DETAILED DESCRIPTION OF THE INVENTION

The term "nonwoven fibrous material" as used herein means a consolidated mass of fibers laid down by mechanical, chemical, pneumatic, electrical or vacuum means or otherwise deposited in the desired shape either flat (webs, mats or sheets) or three dimensional.

As mentioned, acrylamide may be used in combination with another polar monomer or monomers. They include N-(alkyl)acrylamides and N-(alkyl)methacrylamides containing 1 to 8 carbon atoms in the alkyl group; unsaturated carboxylic acids especially the dicarboxylic acids having a backbone containing 2 to 6 carbon atoms; acrylylamides and methacrylylamides of amino alkanoic acids containing 2 to 6 carbon atoms; and alkyl and hydroxy alkyl esters of polycarboxylic acids containing 1 to 4 carbon atoms in the alkyl group, especially such esters of dicarboxylic acids having a backbone containing 2 to 6 carbon atoms.

Specific examples of polar monomers which may be used include N-methylacrylamide; N-ethylacrylamide; N-propylacrylamide; N-methylmethacrylamide; N-ethylmethacrylamide; N-propylmethacrylamide; maleic, fumaric, itaconic, aconitic, and citraconic acids and alkali metal and ammonium salts of such acids preferably the sodium, potassium or ammonium salts; monoethyl maleate; dipropyl fumarate; 2-hydroxyethyl and 2-hydroxypropyl esters of maleic, fumaric, itaconic, aconitic, and citraconic acids.

Examples of compounds represented by Formula I include:

| FORMULA | NAME |
| --- | --- |
| $CH_2=CH-\overset{O}{\underset{\|}{C}}-NH-CH_2OCH_3$ | N(methoxymethyl)acrylamide (NMA) |
| $CH_2=CH-\overset{O}{\underset{\|}{C}}-NH-CH_2OC_2H_5$ | N(ethoxymethyl)acrylamide (EMA) |
| $CH_2=CH-\overset{O}{\underset{\|}{C}}-NH-CH_2OC_4H_9$ | N(butoxymethyl)acrylamide (BMA) |
| $CH_2=CH-\overset{O}{\underset{\|}{C}}-NH-CH_2OC_8H_{17}$ | N(octaoxymethyl)acrylamide (OMA) |
| $CH_2=CH-\overset{O}{\underset{\|}{C}}-NH-CH_2OC_{10}H_{21}$ | N(decaoxymethyl)acrylamide (DMA) |
| $CH_2=\underset{CH_3}{\overset{\|}{C}}-\overset{O}{\underset{\|}{C}}-NH-CH_2OCH_3$ | N(methoxymethyl)methacrylamide (NMMA) |
| $CH_2=\underset{CH_3}{\overset{\|}{C}}-\overset{O}{\underset{\|}{C}}-NH-CH_2OC_3H_7$ | N(propoxymethyl)methacrylamide (PMMA) |
| $CH_2=\underset{CH_3}{\overset{\|}{C}}-\overset{O}{\underset{\|}{C}}-NH-CH_2OC_4H_9$ | N(butoxymethyl)methacrylamide (BMMA) |
| $CH_2=\underset{CH_3}{\overset{\|}{C}}-\overset{O}{\underset{\|}{C}}-NH-CH_2\ OC_5H_{11}$ | N(pentoxymethyl)methacrylamide (AMMA) |
| $CH_2=\underset{CH_3}{\overset{\|}{C}}-\overset{O}{\underset{\|}{C}}-NH-CH_2OC_6H_{13}$ | N(hexoxymethyl)methacrylamide (HMMA) |
| $CH_2=\underset{CH_3}{\overset{\|}{C}}-\overset{O}{\underset{\|}{C}}-NH-CH_2OC_9H_{19}$ | N(nonoxymethyl)methacrylamide (NMMA) |

BMA and BMMA are preferred.

The interpolymers of this invention generally contain about 5 to 70% ethylene, 30 to 95% vinyl chloride, 0.1 to 10% of acrylamide or a combination of acrylamide with another polar monomer and 0.1 to 10% of a compound represented by Formula I. Preferably, the copolymer comprises 20 to 40% ethylene, 60 to 85% vinyl chloride, 2 to 6% acrylamide or acrylamide in combination with another polar monomer and 2 to 6% of a compound represented by Formula I. All percentages are by weight, based on the total weight of the interpolymer. When a combination of acrylamide and another polar monomer is used in the practice of this invention, generally at least 10% by weight of such combination is acrylamide, preferably 50% and more preferably 80%.

The interpolymers are used in the form of a latex or as an organic solution after coagulation with alcohol such as methyl alcohol and ethyl alcohol. The interpolymers are soluble in organic solvents such as dimethyl formamide, tetrahydrofuran and dimethylacetamide.

Latices of this invention are the preferred form. They have high mechanical strength or stability. That is, they resist high shear forces and do not break when subjected to a shear rate of from about $10^4$ to $10^6$ seconds$^{-1}$. They are highly cross-linked, i.e., at least 60 to 95% and preferably at least 80% by weight insoluble in a suitable solvent. No external cross-linking agents are needed and curing conditions are mild. For example, curing takes place at a temperature of from about 100° to 180°C in from 3 to 25 minutes. They maintain their strength when used at higher temperatures.

Interpolymer latices of the present invention generally contain from about 5 to about 65% of the interpolymer by weight, preferably such latices contain from about 10 to about 60% by weight of interpolymer for ease of application by means of dripping, soaking, spraying and the like. The balance is generally water which may also contain minor amounts of reactants or by-products. They have an average particle size of about 500 angstroms to about 2,000 angstroms and a number average molecular weight from about 7,000 to about 35,000 as measured by gel permeation chromotography or intrinsic viscosity.

These new interpolymers, surprisingly, are particularly amenable to hydrolytic modification by the use of small quantities of a strongly alkaline material such as alkali metal hydroxide, or quaternary ammonium hydroxide, such as tetramethyl ammonium hydroxide, or by a strong acid such as the mineral acids, e.g., hydrochloric, sulfuric, phosphoric and nitric. The base or acid used preferably has an ionization constant higher than $10^{-4}$ at 25°C. They are generally treated with acid or base in an amount which is chemically equivalent to up to about 100 percent of the amide equivalent in the interpolymer. An amount of from about 10% to about 90% is preferred with an amount of from about 50% to 80% being more preferred.

The interpolymers of this invention can be prepared by various means well known in the art. Preferably, they are prepared by emulsion polymerization. For example, they are prepared by first mixing ethylene and vinyl chloride in an aqueous medium in the presence of any suitable anionic or nonionic emulsifier and any initiator capable of generating free radicals in the chemical mixture at the chosen reaction temperature and pressure. Acrylamide and a compound represented by Formula I in aqueous solution is added to the polymerizing ethylene and vinyl chloride mixture gradually throughout the reaction. This addition is preferably begun soon after polymerization starts and is added linearly with conversion of monomer to polymer.

The interpolymers of this invention are more preferably prepared by processes which comprise mixing ethylene and vinyl chloride monomers in the presence of an alkaline or acidic buffered reduction-oxidation (redox) initiator-catalyst system water and from about 1% to about 8% based upon the polymer product of an anionic emulsifying agent and reacting the mixture at a temperature, pressure and for a sufficient time to cause polymerization between the ethylene and vinyl chloride to begin. Then, acrylamide and one of the compound represented by Formula I in an appropriate diluent such as water is introduced into the reaction mixture. The process is described in more detail in U.S. Pat. No. 3,428,582 and the subject matter thereof is expressly incorporated herein by reference.

Surprisingly, it was found that when the interpolymers of the present invention were prepared by emulsion polymerization that unless the acrylamide or another polar monomer is present, the latex coagulated on venting.

The bonded nonwoven fibrous products of this invention can be formed of either natural or synthetic fibers or any combination thereof with the selection of the fiber merely depending upon the specific end use intended for the bonded nonwoven fibrous product. Among the fibers that can be used in accordance with this invention are natural fibers, for example, wood, jute, sisal hemp, cotton, cotton linters, silk, mohair, cashmere, asbestos, wool and glass, and synthetic fibers, for example, rayon cellulose esters such as cellulose acetate, polyvinyl chloride, polyvinyl acetate, polyacrylanitrile and copolymers thereof, polyethylene, polypropylene and the like, polyesters such as ethylene glycolterephthalate polymers, and polyamides of the nylon type.

In many applications, the bonded nonwoven fibrous products of this invention are prepared from a plurality of natural fibers, or a plurality of synthetic fibers, or a combination of natural and synthetic fibers. Combinations of wood fiber and cotton fiber can be advantageously employed in end products such as shoe liners and the like. In general, the wood fiber comprises the major amount of the fiber content of such bonded nonwoven fibrous products. Combinations of glass fibers and asbestos fiber are generally employed in insulating applications. The weight ratio of glass fiber to cellulosic fiber in such bonded nonwoven fibrous products is usually from 1:10 to about 10:1.

In wearing apparel applications, a combination of wood fibers and nylon fibers or a combination of wood fibers and rayon fibers can be advantageously employed. Combinations of wood fiber and nylon fiber as well as combinations of wood fiber and polyester fiber are also widely employed in various applications where reinforced sheeting is required. In such combinations of natural and synthetic fibers, the weight ratio of natural fiber to synthetic fiber is generally from about 1:20 to about 20:1 and preferably from about 1:1 to about 3:1.

The nonwoven fibrous materials useful in the preparation of the bonded nonwoven fibrous products of this invention can be prepared by any method known to the art. Thus, the nonwoven fibrous material can be made of fibers deposited in a random manner as well as fiber oriented or aligned along a particular axis. Nonwoven fibrous materials in the form of two-dimensional webs can be prepared by the following methods. Oriented webs are produced using conventional web-style machines, such as openers, pickers, cards, or garnetts. Cross-laid webs are made in a manner similar to oriented webs, except that the fibers are carefully placed at right angles to the machine direction to improve cross-wise strength.

Random webs are produced in air-lay machines, and the nonwoven fibrous material has equal strength in all directions. In the air-lay method, continuous filaments are fed through a cutter or breaker which discharges the fibers into the discharge side of a blower. Suitable conduits are provided to guide the fibers to a collecting screen or air-pervious structure for collecting the fibers in the form desired. The screen may be in the form of an endless traveling belt passing through the lower portion of a tower into the upper portion of which the blown fibers are introduced by the conduit. A suction box may be placed beneath the traveling screen to assist in the deposition of the fibers thereon. Instead of using a traveling flat screen, a stationary formed screen may be used. For example, the screen may take the form of a hat shaped cone, such as that used in the felt hat-making industry. Alternatively, it may have any other form which is suitable to produce the desired shape of the bonded nonwoven fibrous product such as a rectangular tray. As is the case with the endless traveling belt, suction may also be applied beneath the stationary screen to assist deposition of the fibers thereon.

Random webs are also produced by the direct spray method from a solution of molten mass of the fiber materials. This is the conventional procedure for the formation of glass fibers or mineral wool fibers, as well as those of nylon or thermoplastic materials, adapted to be dissolved in a suitable solvent or to be melted. The solution or melt is directed to nozzles or jet-forming orifices and a high pressure fluid stream, such air, nitrogen or steam, is directed against the stream or streams of filament-forming material to disrupt them and coagulate them as fibers in the vicinity of the orifices. Electrostatic spinning methods can also be employed for this purpose. As in the case of the use of blowers, the disrupted and dispersed fibers can be directed to the top of the settling tower and allowed to settle with the aid of suction devices upon a suitable traveling or stationary screen at the bottom of the tower. This procedure is particularly adapted to the production of fibers of siliceous materials such as glass or mineral wool, as well as to thermoplastic resin fibers.

Wet random webs are formed from a slurry of dispersed fiber on papermaking or modified papermaking machines. Spunbonded webs are made of randomly oriented continuous filament fibers bonded at the cross-over point. The method includes extrusion of the continuous filament fibers, drawing to orient the fiber, some fiber entanglement by liquids or air, and bonding at the cross-over points.

The bonded nonwoven fibrous products of this invention are generally prepared by a method which comprises consolidating the loose fibers into nonwoven fibrous material having the strctural configuration of the desired bonded nonwoven fibrous product, dispersing an interopolymer bonding agent of this invention within the nonwoven fibrous material, and heating the impregnated nonwoven fibrous material to a temperature sufficient to coalescense and fuse the interpolymer, and optionally heating to a temperature sufficient to cross-link the interpolymer if a sulfur cross-linking agent is employed.

Another method for the preparation of the bonded nonwoven fibrous products of this invention which is particularly useful when the nonwoven fibrous material is formed by the air-lay method in an air-lay machine comprises contacting the fibers with an interpolymer dispersion or powder as they fall through the settling chamber to their point of deposition. This is advantageously carried out by spraying the interpolymer dispersion or powder into the settling chamber at some intermediate point between the top and the bottom thereof. By spraying the fibers as they descend to the point of collection, it is possible to effect a thorough distribution of the interpolymer bonding agent among the fibers before they are collected into the nonwoven fibrous material. In the production of certain fibrous products wherein a hot molten mass of a polymer such as nylon or a fused siliceous mass or glass is disrupted by jets of heated air or steam, the bonding agent dispersion or powder can be sprayed directly on the fibers while still hot so that immediately after deposition the bonding agent is set and it bonds and interlocks the fibers in proper relationship. Still another method involves adding the interpolymer to the fibers prior to consolidation as, for example, by adding the interpolymer to the aqueous fiber slurry in a modified papermaking process.

The interpolymer bonding agents of this invention can be applied to the fibers of the nonwoven fibrous material by any means known in the art. The interpolymer bonding agents are usually applied to the fibers of the nonwoven fibrous material by application to the surface thereof, or by submersion of the nonwoven fibrous material in a liquid, thickened or foamed dispersion so that the bonding agent penetrates into the interior of the nonwoven fibrous material. Where the nonwoven fbirous material is a two-dimensional fabric in the form of a fleece or web, the bonding agents are usually applied in the form of an aqueous dispersion. In a typical application, the fabric is impregnated with the bonding agent by dipping or immersing the fabric in the dispersion to provide sufficient wet pickup of the bonding agent. The wetted, nonwoven fibrous material in the form of a fleece or web can be passed between a pair of pressure rolls to effect substantially uniform impregnation and also to control the amount of the bonding agent applied. The impregnated nonwoven fibrous material is dried by conventional means known to the art in order to remove all or a portion of the water and to effect coalescence and fusion of the interpolymer within the nonwoven fibrous material. The drying temperature and drying time are dependent upon the size, shape and cross-section of the impregnated, nonwoven fibrous material. In general, the drying temperature is controlled so that no appreciable deterioration or degradation of the fibers or the interpolymer occurs.

The amount of bonding agent based on the weight of the fiber component of the bonded nonwoven fibrous product can vary widely depending upon the characteristics desired in the final product and the specific end use. The bonded nonwoven fibrous products of this invention generally contain from about 2% to about 200% of interpolymer based on the weight of the fibers. For the production of preforms intended to be converted into shaped articles, it is preferred to employ from about 2% to about 10% of the bonding agent based on the weight of the fibers. In the production of insulation materials, the amount of bonding agent employed generally falls in the lower part of the above range if the bonding agent is applied primarily adjacent to the surface or surfaces of the product or if it is applied in conjunction with other binders.

When the bonding agent is to serve mainly to bond the fibers together to form a bonded nonwoven fibrous product in which the maximum porosity is retained in conjunction with a minimum change of fiber hand and drape characteristics as well as an increase in tensile strength, there is preferably employed from about 10 to about 70% by weight of bonding agent solids based on fiber content. The lower portion of this range generally gives the maximum porosity and provides a minimum change in the fiber hand and drape characteristics although in the higher portion of this range porosity is mainly retained and the fiber hand and drape characteristics are still evident. The bonded nonwoven fibrous products thus obtained are advantageously used for many sanitary purposes, such as table napkins, bibs, tablecloths, sanitary napkin covers, disposable diapers, disposable sheets, and surgical dressings and compresses. When this amount of bonding agent is used there is relatively little or no "window paning", i.e. the interstices between the fibers are left open leaving a highly porous bulky product. If desired, the density of the product can be modified by the application of various amounts of pressure prior to, or in many cases, after the saturated nonwoven fibrous material has been heated for bonding.

Bonded nonwoven fibrous products containing from about 40 to about 150% by weight of bonding agent based on the weight of the fiber generally find use in the garment industry to provide interlining fabrics for coats, dresses, collars, cuffs and the like and to provide outer wearing apparel fabrics, such as blouses, skirts, shirts, dresses and the like. Bonded nonwoven fibrous products containing the bonding agent in this range are also useful as curtain and drapery materials. In addition to the general household and apparel uses mentioned above, the bonded nonwoven fibrous products of this invention in which 10 to 100% by weight of bonding agent based on the weight of the fiber is employed find many light industrial uses as wiping cloths, filters and lining materials for packaging.

Bonded nonwoven fibrous products of the present invention which contain from about 100 to about 200% by weight of the bonding agent based on the weight of the fiber are particularly useful for heavy industrial uses where durability and resistance to wear are desired. Such uses include industrial gaskets, packings, filters and the like.

If desired, the aqueous interpolymer dispersion can also contain a wetting agent to assist penetration of the nonwoven fibrous material to which it is applied. The aqueous dispersions can also contain a foaming agent or they can contain a defoamer when the ingredients of the aqueous dispersion have a tendency to give rise to foaming and when such foaming is undesirable. The convention wetting agents such as the sodium salt of dioctylsuccinic acid can be used and the conventional foaming and defoaming agents can be employed such as sodium soaps including sodium oleate for foaming and octyl alcohol or certain silicone antifoaming agents for defoaming.

The bonded nonwoven fibrous products of this invention are characterized by high tensile strength, good elongation, softness, good hand and flexibility, good drape and resistance to many common solvents and detergents. With these properties, the bonded nonwoven fibrous products of this invention are suitable for use in a wide variety of end applications, many of which have been noted above and including, for example, paperboard, cleansing tissues, toweling, wrappings for food products, tea bags, wallpaper, mats, napkins, table cloths, heat or sound insulating materials, electrolytic condensers, luggage skin and interiors, glue coated tape stocks, pressure sensitive tape stocks, masking sheets, pennants, banners, labels, book cover stocks, projection screens, gaskets, printing press top cover sheets, waterproof wrapping paper, sandpaper backs, printing tape, hospital items such as caps, masks, gowns, jackets, scrub pants, capes, shoe covers, wash cloths, pillow cases, wipes, bandages, alcohol preps, surgical dressings, napkins, cubicle curtains, drapes, diapers and sheets, filters for food processing, motors, machines, air systems or liquid systems, electrical insulators, tapes, ribbons, automobile head and arm rests, upholstery, stuffed pillows, fiberfills, sleeping bags, slip covers, bed spreads, blankets, curtains, window shades, carpeting (nonwoven), wearing apparel, clothing insulation, underwear, diapers, interfacing and interliners (collars and cuffs).

The bonding agents of this invention have been described as the sole bonding agent for the bonded nonwoven fibrous products of this invention. However, for some applications, the interpolymers can be employed in combination with termosetting, precondensate resins, such as aminoplasts, which are capable of cooperating with the bonding agent to give enhanced properties of launderability and dry cleaning resistance to the bonded nonwoven fibrous products, particularly when they are in the form of fabric material. The preferred aminoplast resins for blending with the interpolymers are the condensation products or precondensates of urea and formaldehyde and ethylene, urea and formaldehyde.

The following examples will illustrate the invention. Parts and percentages are by weight unless otherwise indicated.

EXAMPLE I

This example illustrates the preparation of a 27/66.5/3.4/3.1 weight percent E/VCL/acrylamide (ACRD)/BMA interpolymer latex.

| Reaction Vessel Initial Charge | | |
|---|---|---|
| Sodium lauryl sulfate (SLS) | 1.5 g | |
| Fe-ethylenediamine tetraacetate (FE.EDTA) | 0.01 mille mole | |
| Ammonium persulfate (APS) | 100 mille mole (22.8 g) | |
| H$_2$O qs | 1700 g | |
| Initial Monomer | | |
| Ethylene | 615 g | |
| VCL | 495 g | |
| Added in Run | | |
| Sodium formaldehyde sulfoxylate (SFS) | 29 mille mole | |
| Auxilary SLS Stream | 12 gm | 40 ml of 30% soln.) |
| ACRD | 56 gm | Mixed Stream of 30% ACRD |
| SLS | 14 gm | 7.5% SLS |

-continued

Reaction Vessel Initial Charge

| BMA[1] | 51 gm | (186 ml total) |
|---|---|---|

Polymerization 330 min/40°/1920 psi

Product

| Latex Polymer | 3530 gm | pH | 2.9 |
|---|---|---|---|
| | 1618 gm | Surface Tension | 46 dy/cm |
| Ethylene | 27.4% | Viscosity | 112 cp |
| VCL | 66.5% | Tot. Sol. | 47.2% |
| ACRD | 3.4% | Tg | −7°C |
| BMA | 3.1% | | |
| SLS | 1.7% | | |

Initial Charge is added to a one gallon stirred autoclave then Initial Monomer is added. Polymerization is started by pumping in SFS solution. Pressure is maintained by adding VCL on demand (758 g is used). Within a minute or two after polymerixation starts, the auxilary SLS stream is started, followed by the Mixed Stream and BMA at a rate proportional to the VCL pumping rate. After 330 minutes, the reaction is stopped and the latex rapidly vented through a ball valve at the bottom of the clave.

The latex did not break when subjected to a $10^5$ seconds$^{-1}$ rate of shear.

Cross-linking is determined as follows. A sample of Example I latex is cast on a glass plate, air-dried, and heat-treated in a circulating air oven for 20 minutes at 150°C. It is then weighed and soaked in a solvent, 96% tetrahydrofuran/4% water, until extraction is complete (at least four hours). The specimen is then removed, blotted, dried and weighed. It is 71% insoluble. The higher the percent, the better the cross-linking.

EXAMPLE II

An aqueous dispersion of 27.4/66.5/3.4/3.1 weight percent E/VCL/ACRD/BMA[1]/ interpolymer prepared substantially in accordance with Example I and containing about 48.5 weight percent polymer solids is coagulated by means of isopropanol. The interpolymer is washed with water and dried.

EXAMPLE III

Interpolymers of the following composition are prepared and tested substantially in accordance with the procedure of Example I above.

| Composition | AVG Particle Size | Mw | Tg, °C | INSOL In THF% |
|---|---|---|---|---|
| E/VCL/ACRD/BMA[1] | | | | |
| 27.0/66.5/3.4/3.1 | 690 | 64,000 | −7.0 | 71 |
| 25.9/67.9/3.3/2.9 | 710 | 95,000 | 0.5 | 77 |

EXAMPLE IV

Interpolymers of the following compositions are prepared substantially in accordance with the procedure of Example I above.
E/VCL/ACRD/MMA
E/VCL/ACRD-N-methylacrylamide/EMA
E/VOL/ACRD-N-methylmethylacrylamide/AMA
E/VCL/ACRD-maleic acid/NMA
E/VCL/ACRD-2-hydroxyethyl fumaric acid/MMA
E/VCL/ACRD-aconitic acid/BMMA

EXAMPLE V

Latices of Example IV are coagulated by means of isopropanol and are washed and dried.

EXAMPLE VI

Preweighed samples of Hollingsworth and Vose nonwoven fabric composite comprising 75 weight percent cellulosic fiber and 25 weight percent nylon fiber are immersed in aqueous dispersions of E/VCL/ACRD/-BMA[1] bonding agents. The aqueous dispersions contain 13.5 weight percent interpolymer solids. The impregnated fabrics are passed through a size press, weighed, dried for about two minutes at a temperature of about 118°C and weighed. The bonded non-woven fabrics are subjected to calendering through a single nip for smoothness and tested for hand and drape characteristics, toughness and tensile strength. Hand and drape characteristics are determined qualitatively by touch and results are given on a scale of 1 through 10. Number 1 means very soft and highly flexible. Number 10 means very rough and non-flexible. Tensile strength is determined by TAPPI T404 OS-61 with a table model Instron. Toughness is determined by measuring the area under the stress strain curve. Results and further details are given in the Table below where the amount of bonding agent in the bonded nonwoven fabric is given in percent by dry weight based on the weight of the fiber in the nonwoven fabric, tensile strength is given in lb./in., and toughness is given in inch-pounds.

| E | Bonding Agent, % Composition VCL | ACRD | BMA[1] | Bonding Agent In Nonwoven Fabric | Hand and Drape | Tensile Strength | Toughness |
|---|---|---|---|---|---|---|---|
| 27.0 | 66.5 | 3.4 | 3.1 | 35 | 4 | 7.2 | 3.1 |
| 25.9 | 67.9 | 3.3 | 2.9 | 35 | 4 | 7.1 | 2.6 |

[1]iso form

EXAMPLE VII

Following the procedure of Example VI, bonded fibers may be prepared by substituting for the bonding agent used in Example III, those of Example IV

What is claimed is:

1. A bonded nonwoven fibrous product comprising nonwoven fibrous material bonded with an interpolymer consisting essentially of
   A. 5 to 70% by weight based on the total weight of the interpolymer of ethylene;
   B. 30 to 95% by weight based on the total weight of the interpolymer of vinyl chloride;
   C. 2 to 10% by weight based on the weight of the interpolymer of acrylamide or acrylamide in combination with a polar monomer selected from the group consisting of methacrylamide; N-(alkyl) acrylamide; N-(alkyl) methacrylamide; unsaturated carboxylic acids; alkali metal salts and ammonium salts of unsaturated carboxylic acids; acrylylamides and methacrylylamides of aminoalkanoic acids; and alkyl and hydroxy alkyl esters of unsaturated carboxylic acids and D. 2 to 10% by weight based on the total weight of the interpolymer of a compound represented by the formula

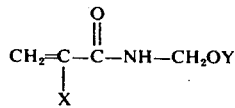

wherein X represents $CH_3$ or H and Y represents an alkyl group containing from 1 to 10 carbon atoms.

2. A product according to claim 1 wherein (C) is acrylamide.

3. A product of claim 2 wherein the interpolymer contains 20 to about 40 weight percent of (A), 60 to about 85 weight percent of (B), 2 to about 6 weight percent of (C), and 2 to about 6 weight percent of (D).

4. A product according to claim 3 wherein the nonwoven fibrous material is made of natural fiber.

5. A product according to claim 4 wherein the natural fiber is cellulosic.

6. A product of claim 3 wherein the nonwoven fiber material is made of synthetic fiber.

7. A product according to claim 6 wherein the fiber is polyester fiber or polyamide fiber.

8. A product of claim 3 wherein the nonwoven fibrous material is a combination of natural fiber and synthetic fiber.

9. A product according to claim 3 wherein the interpolymer is present in an amount from about 2 weight percent to about 200 weight percent based on the weight of the fiber.

10. A product according to claim 9 wherein X is H and Y is an alkyl group containing 4 carbon atoms.

11. A product according to claim 2 wherein said interpolymer before use was hydrolyzed by treating said amide moieties with an acid as a base having an ionization constant higher than about $10^{-4}$.

* * * * *